United States Patent [19]

Cheselka

[11] 4,250,834
[45] Feb. 17, 1981

[54] PET SANITARY FACILITY

[76] Inventor: Stephen Cheselka, 87 Columbia St. (Apt. 21-F), New York, N.Y. 10002

[21] Appl. No.: 50,497

[22] Filed: Jun. 20, 1979

[51] Int. Cl.³ .............................................. A01K 29/00
[52] U.S. Cl. ........................................................ 119/1
[58] Field of Search ........................................ 119/1, 19

[56] References Cited

U.S. PATENT DOCUMENTS

| | | | |
|---|---|---|---|
| 3,326,186 | 6/1967 | Doll | 119/19 |
| 3,339,527 | 9/1967 | Burroughs | 119/1 |
| 3,358,647 | 12/1967 | Wilson | 119/1 |
| 3,386,417 | 6/1968 | Machowski | 119/1 |
| 3,416,495 | 12/1968 | Wilson | 119/1 |
| 3,809,013 | 5/1974 | Rigney et al. | 119/1 |

*Primary Examiner*—Hugh R. Chamblee
*Attorney, Agent, or Firm*—Frishauf, Holtz, Goodman & Woodward

[57] ABSTRACT

A pet sanitary facility having a stack of a plurality of liquid impervious and a plurality of liquid absorbant layers, interleaved with each other, located below a perforated platform member made of non-liquid adsorbant material. The peripheral portions of the stack may have support means surrounding same to raise the peripheral portions thereof. Spacer and support means is provided between the platform member and the stack.

21 Claims, 12 Drawing Figures

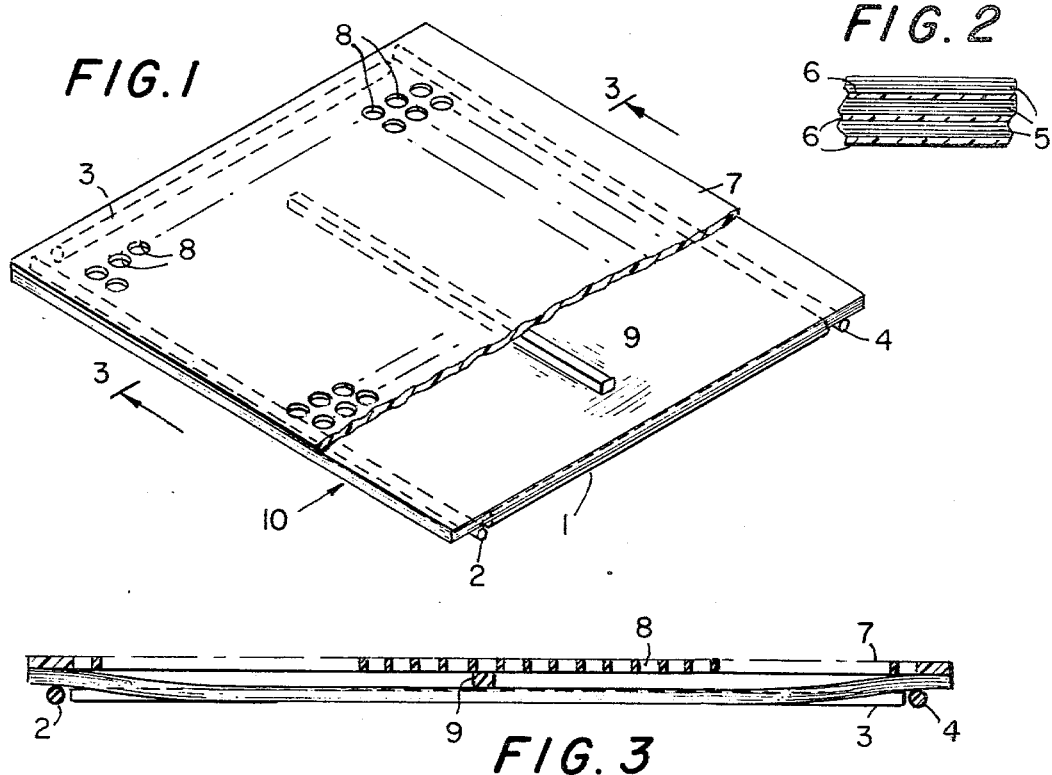
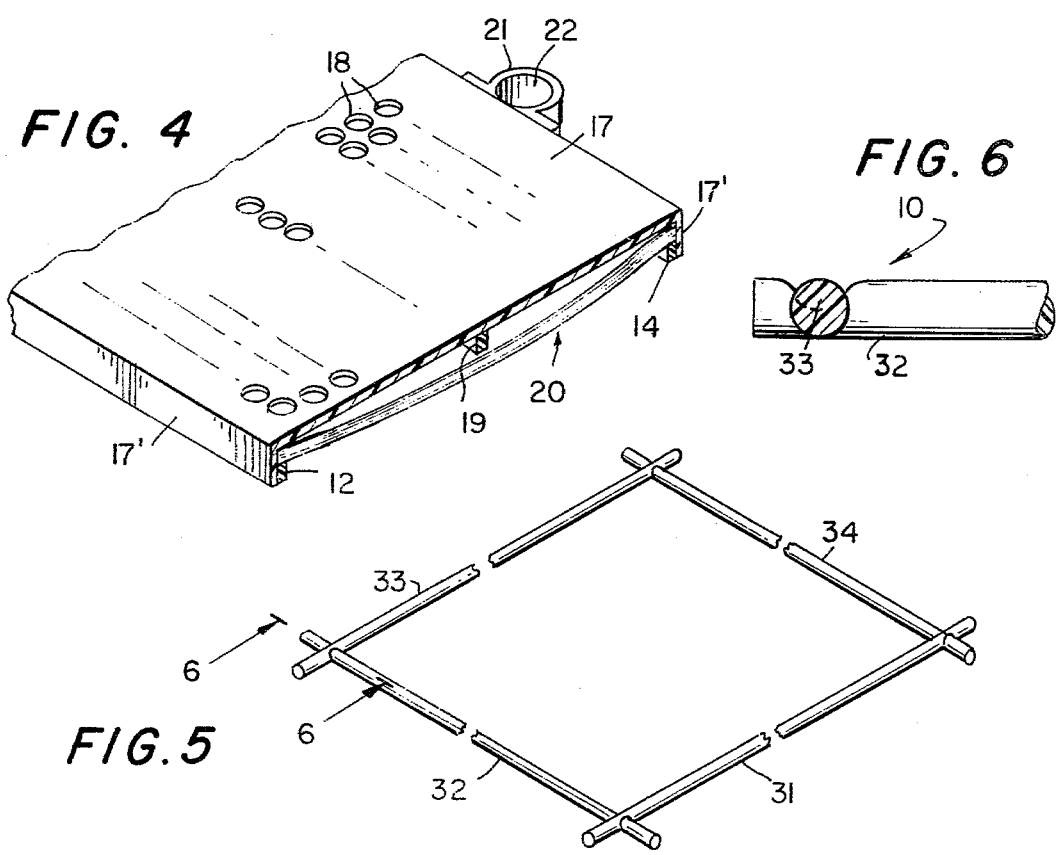

PET SANITARY FACILITY

BACKGROUND OF THE INVENTION

This invention relates to a pet sanitary facility, and more particularly to a sanitary facility with easily removable waste receiving surfaces.

Various pet sanitary facilities are known. However, the object of the present invention is to provide an improved pet sanitary facility which provides a substantially flat, comfortable upper platform surface which is perforated to permit liquid waste from the pet to pass therethrough. It is a further object of the invention to provide an improved pet sanitary facility wherein the liquid absorbing members below the perforated platform may be easily picked up for disposal and wherein a plurality of layers of such absorbant material is provided so that the user may more easily and quickly renew the liquid absorbing surface of the facility.

SUMMARY OF THE INVENTION

According to the present invention, a pet sanitary facility comprises a plurality of liquid impervious, flexible sheets; and a plurality of liquid absorbing sheets of substantially the same width and length dimensions of the liquid impervious sheets arranged in a stack with the liquid impervious sheets, at least one liquid absorbing sheet being interposed between adjacent liquid impervious sheets to form a stack of interleaved sheets of liquid impervious and liquid absorbing sheets. A plurality of liquid absorbent and liquid impervious layers are provided in the stack, and the uppermost layer of the stack is liquid absorbent. Further provided is a perforated upper platform member of non-liquid absorbent material located above the stack of interleaved sheets for receiving a pet thereon; and means spacing the perforated platform member from the stack of interleaved sheets.

Preferably, the liquid impervious sheets are plastic sheets and the liquid absorbing sheets are sheets of newspapers. It is also preferable that the platform member is a flexible plastic sheet, but with sufficient rigidity to support a pet, such as a dog or cat, thereon. The perforations in the upper platform member are preferably distributed over the complete surface thereof. However, an unperforated border area may be provided.

BRIEF DESCRIPTION OF THE DRAWINGS

FIG. 1 is a top perspective view, partly in section, of a first embodiment of the invention;

FIG. 2 is a partial side view illustrating the multilayer construction of the waste absorbing and non-absorbing layers;

FIG. 3 is a sectional view taken along the lines 3—3 in FIG. 1;

FIG. 4 is a modified embodiment of the invention;

FIG. 5 illustrates a modified base or frame construction according to the present invention;

FIG. 6 is a partial sectional view along the lines 6—6 in FIG. 5;

DETAILED DESCRIPTION

Figure 7:
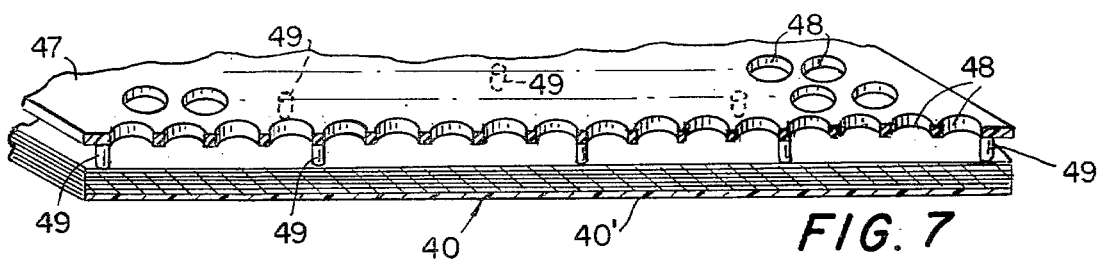
FIG. 7 is a part-cross-sectional, part-perspective view of another embodiment of the invention.

FIG. 1 illustrates a first embodiment of the present invention which comprises four elongated bar-like members 1-4 arranged to form a rectangle. The bar members 1-4 are preferably arranged end-to-end as shown in FIG. 1. The bar-like members 1-4 are shown as round rods in FIG. 1, but they may take any other shape, for example rods with square or rectangular cross-section, hollow rod-like members, U-shaped channel-like members, etc. Lying on top of the rectangular frame made from bar members 1-4 is a stack 10 of alternating layers of newspaper 5 and liquid impervious plastic sheets 6 (see FIG. 2). Three of such alternating layers are shown in FIG. 2, but a different number of layers can be provided, as desired. The number of sheets of newspapers in each of the layers 5 may also be varied, depending upon the amount of waste material to be absorbed. It has been found that newspapers are highly liquid absorbant and excellently absorb liquid animal wastes. Moreover, newspapers are readily available and serve as an inexpensive supply of liquid absorbent sheets.

On top of the alternating layers of newspapers and plastic sheets is placed a perforated platform sheet 7 having a plurality of perforations 8 formed therein. Preferably, the perforations are formed over the whole surface of sheet 7.

Below sheet 7 is another rod 9 which may be attached to the bottom of sheet 7 or may just be loosely interposed between the top layer of newspapers and the undersurface of sheet 7. While providing additional support for sheet 7, rod 9 serves to depress the central portion of the alternating stack of newspapers and plastic sheets 5, 6 to provide a spacing between the upper sheet of newspapers and the upper layer 7, and also to provide a depressed receptacle-like area to confine liquid pet wastes. This enhances the performance of the apparatus of the present invention on unlevel floor or ground in that the depressed central portion prevents liquid wastes from dripping or seeping out of the edge portions of the layers of newspapers 5.

The upper layer 7 is preferably formed of a plastic material which is highly non-absorbent to liquid wastes and which permits liquids to substantially "roll-off" thereof.

In use, when the upper layers of newspaper become soiled, the platform 7 is raised and the user merely removes the upper layer of newspapers and the plastic sheet 6 immediately therebelow, thereby exposing the next layer of newspapers for use. The plastic sheet which is removed with the soiled layer of newspaper makes for easy pick-up and disposal of the soiled layers of newspapers. The perforations in the upper platform are small enough so that solid pet waste remains on the upper surface for easy pick-up and disposal, for example in the toilet. The platform 7 may be easily removed for rinsing and cleaning, as required. The raised platform eliminates or substantially reduces absorption of urine by the pet paws thereby preserving the condition of costly rugs and flooring in the user's living quarters.

The plastic material from which the platform 7 is fabricated should be impervious to stains and odors.

The perforations or openings 8 in platform 7, and the perforations in the other embodiments discussed hereinbelow, may take any shape or configuration. For example, they may be round, oval, polygonal, elongated slots, tortuous slots, unusually shaped openings, etc. In a preferred embodiment, the perforations 8 may be round with a diameter of approximately ¼-½ inch and with an inter-perforation spacing of approximately ⅛-¼ inch. The spacer 9 is preferably about ½-¾ inch in height, as are the rods 1-4. These dimensions, of course, can be varied, depending upon application.

A typical plastic material from which the upper sheet can be made is polyethylene, polycarbonate (nylon, etc.), acryllic or any other suitable plastic material. It is preferable when the device is to be mailed to a user that the upper sheet 7 be formed of a flexible layer so that it can be rolled up for mailing. In this instance, polyethylene is a particularly suitable material for the sheet 7. The perforations 8 in sheet 7 are discussed in greater detail hereinbelow with respect to FIGS. 9-12.

FIG. 4 illustrates a modified embodiment of the invention wherein the upper layer 17 has a skirt 17' formed around all four sides thereof. Only two such sides of skirt 17' are illustrated in FIG. 4 for ease of illustration. The rods 12, 14 (similar to rods 2, 4) are rectangular in cross section in this embodiment. Transversely extending rods, such as rods 1 and 3 of FIG. 1, are provided substantially as illustrated in FIG. 1, but are not shown in FIG. 4. The upper surface of platform 17 is perforated with holes 18, as is the upper platform in FIG. 1. The stack 20 of alternating layers of newspapers and plastic sheets rests on rods 12, 14 (and rods similar to rods 1 and 3 of FIG. 1) and a member 19 bears down upon the central area of stack 20 to depress the central portion thereof, as in FIG. 1. In FIG. 4, the rods 12, 14 are not attached to skirt 17'. The member 19 also provides support for the upper layer 17.

In the embodiment of FIG. 4, the skirt 17' can be formed on only two opposite sides, so that the upper platform can be fabricated to be more easily rolled up for mailing purposes. However, it is preferred that the skirt be provided around all four sides for better appearance of the device and for further protection against leakage of waste material outside the pet facility.

FIGS. 5 and 6 illustrate a modified arrangement of the bars 1-4 of FIG. 1. The end areas of the bars 31-34 of FIG. 5 are notched as shown more clearly in FIG. 6 so that they interlock with each other. The notches are preferably equally dimensioned, as shown in FIG. 6, so that the bars are substantially flush with each other at the upper horizontal extremities thereof. This arrangement provides an interlocked base structure which may be preferable under certain circumstances.

FIG. 7 illustrates a further embodiment of the invention wherein the stack of alternating sheets of newspaper and plastic 40 are placed directly on a horizontal support, such as the floor. The stack 40 of alternating layers of plastic sheets 46 and newspapers 45 is shown in greater detail in FIG. 8. The bottommost layer 40' is a thicker plastic sheet which forms the base of the facility, the thicker plastic sheet being provided to insure that there is no leakage of waste material to the supporting surface, such as the floor. The upper platform 47 is perforated at 48 over the top surface thereof and is supported/spaced from the stack 40 by means of legs 49. The legs 49 may be elongated members such as members 9, 19 of FIGS. 1 and 4, respectively, or may be individual separate feet spaced along the undersurface of platform 47 as illustrated in FIG. 7. In some instances it is not necessary to provide a bottom frame structure, such as rods 1-4 of FIG. 1, to support or raise the side edges of the stack 40. The absorbancy of the upper layer of absorbant material (i.e., newspapers) is sufficient to prevent leakage of liquid waste such as urine out of the sides of the facility. As in the other embodiments, the platform 47 is preferably made of plastic material which is highly non-absorbant to liquids and in order to provide a more easily mailable product, the plastic material is preferably of a type which will permit the platform 47 to be rolled up for mailing.

In the above embodiments, it is noted that the upper platform 7, 17, 47 may be made of flexible material so that it may be rolled up. However, the upper platform must have sufficient rigidity to support a pet thereon. In this connection, the various types of spacer members between the bottommost surface of the upper platform and the uppermost surface of the alternating layer stack also serve to support the upper platform while a pet is on same.

Figure 9:
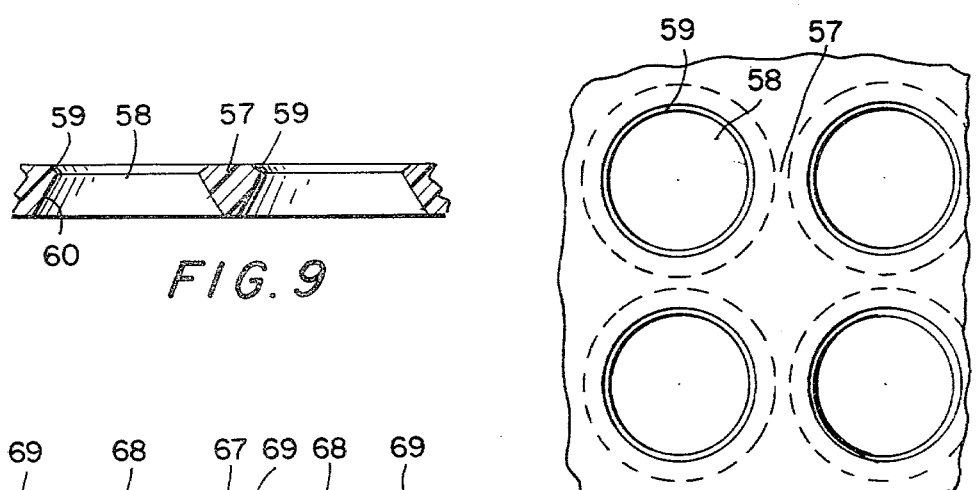
FIG. 9 is an enlarged sectional view of a portion of the upper platform layer according to the present invention.
Figure 10:
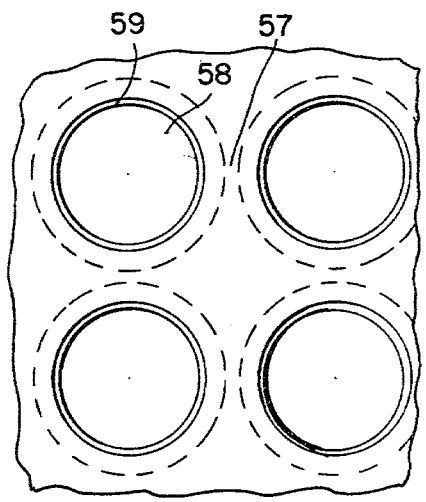
FIG. 10 is a top view of a portion of the platform layer of FIG. 9.

FIG. 9 illustrates a particularly advantageous form of upper platform member 57 with apertures 58 therein. The upper opening areas of the apertures 58 have tapered or inclined surfaces 59 and have outwardly tapered lower surfaces 60. The tapered upper portions 59 act as a funnel and the tapered bottom portion help draw off liquid deposited on the upper platform 57.

Figure 11:
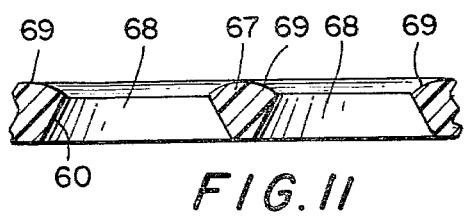
FIG. 11 is an enlarged sectional view of a portion of a modified upper platform layer according to the present invention.
Figure 12:
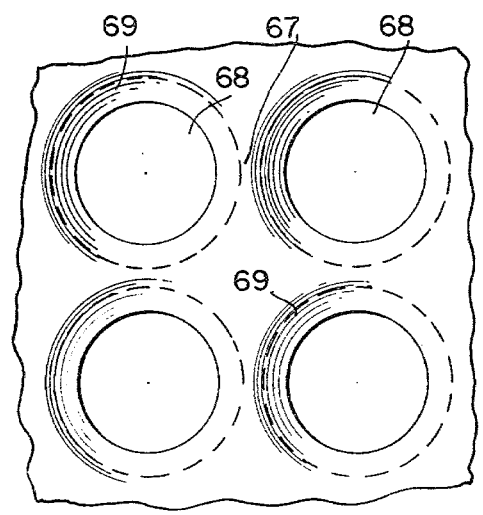
FIG. 12 is a top view of a portion of the modified platform layer of FIG. 11.

FIG. 11 illustrates a similar arrangement, but wherein the upper surfaces 69 of the portions of the upper platform 67 between perforations 68 are curved. This provides a comfortable surface for the pet. This also enhances the rolling off effect of liquid waste deposited by the pet on the upper surface.

The liquid absorbant sheets, such as newspapers, may have a deodorant material applied thereto in the form of a liquid or a spray. In place of newspapers, special absorbant layers may be provided which are more highly liquid absorbant than newspapers. Such absorbant layers may be deodorized or non-deodorized, as desired. Alternatively, the apparatus may be provided with a receptacle, such as indicated at 21 in FIG. 4, for holding a container 22 of deodorant material. The deodorant may be liquid, stick-like or may be a spray material which is conveniently stored in receptacle 21.

The pet facility of the present invention may be fabricated in any desired size. Moreover, the facility may be fabricated in standard sizes which may be placed adjacent each other to enlarge the overall pet sanitary facility. Preferably, the facility is fabricated in sizes which are compatible with readily available sheets of newspaper so that the newspaper sheets need not be cut to size by the user. Typical dimensions for the upper platform members 7, 17, 47 may be approximately 15×22¼ inches, or approximately 30×22¼ inches, to conform with sizes of readily available sheets of newspapers. As mentioned above, the overall facility can be enlarged by placing a plurality of facilities adjacent each other.

Figure 8:
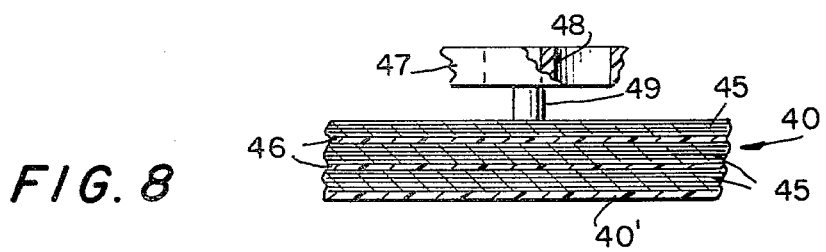
FIG. 8 is a partial sectional view of the circled portion in FIG. 7.

The thicker plastic layer 40' of the stack 40 of FIG. 8 can be used with the stacks 10, 20 of FIGS. 1 and 3, respectively, to provide added protection to the floor or surface on which the facility is placed. The skirt 17' of FIG. 3 can be used with any of the other embodiments, as can be deodorant receptacle 21. The interlocked support members 31-34 of FIG. 5 can be used with the embodiment of FIG. 3. Other interlocking arrangements for the bars 31–34 can be used, as should be apparent.

I claim:

1. A pet sanitary facility comprising:
a plurality of liquid impervious, flexible sheets;
a plurality of liquid absorbing sheets of substantially the same width and length dimensions of said liquid impervious sheets arranged with said liquid impervious sheets to form a stack of a plurality of liquid impervious layers and a plurality of liquid absorbing layers, each liquid absorbing layer including at least one liquid absorbing sheet, and each liquid impervious layer including at least one liquid impervious sheet, said layers alternating with each other such that liquid absorbing layers are interposed between adjacent liquid impervious sheets to form said stack of interleaved liquid impervious and liquid absorbing layers, the uppermost layer of said stack comprising at least one liquid absorbing sheet and the bottom-most layer of said stack comprising at least one liquid impervious sheet;
a perforated upper platform member of non-liquid absorbant material located above said stack for receiving a pet thereon; and
means spacing said perforated platform member from said stack of interleaved sheets.

2. The pet sanitary facility of claim 1 wherein said platform layer is a flexible plastic sheet.

3. The pet sanitary facility of claim 1 wherein said flexible liquid impervious sheets are thin plastic sheets.

4. The pet sanitary facility of either of claims 1 or 3 wherein said plurality of liquid absorbant sheets comprises a plurality of sheets of newspapers.

5. The pet sanitary facility of claim 4 wherein a plurality of sheets of newspapers is interposed between each adjacent pair of liquid impervious sheets in said stack.

6. The pet sanitary facility of claim 1 further comprising support means under said stack of interleaved layers over at least a portion of the periphery of said stack to raise peripheral portions of said stack.

7. The pet sanitary facility of claim 6 wherein said support means is located around substantially the complete periphery of said stack of interleaved layers.

8. The pet sanitary facility of claim 7 wherein said support means comprises a plurality of elongated members.

9. The pet sanitary facility of either of claims 1 or 8 wherein said means spacing said perforated platform member from said stack of interleaved layers is located in substantially the central portions of said perforated platform member to support said platform member and to depress at least the central portions of said stack.

10. The pet sanitary facility of claim 1 further comprising a plurality of interlock bar-like members located under said stack of interleaved layers and around the complete peripheral portion of said stack to raise said peripheral portions of said stack.

11. The pet sanitary facility of claim 1 wherein said perforated upper platform member comprises a substantially vertically extending skirt member for enclosing at least a portion of the periphery of said stack of interleaved layers.

12. The pet sanitary facility of claim 11 wherein said upper platform member comprises said skirt member around all sides thereof.

13. The pet sanitary facility of either of claims 1 or 2 wherein the portions of said upper platform member between perforations are substantially flat.

14. The pet sanitary facility of claim 13 wherein said perforations have beveled edges extending to said flat portions, and have outwardly flared surfaces extending toward the bottom surface of said upper platform member.

15. The pet sanitary facility of either of claims 1 or 2 wherein the portions of said upper platform member between said perforations is substantially rounded.

16. The pet sanitary facility of claim 15 wherein said perforations have outwardly flared surfaces extending toward the bottom surface of said perforated platform member.

17. The pet sanitary facility of claim 1 further comprising an additional liquid impervious flexible sheet located under said stack of interleaved layers.

18. The pet sanitary facility of either of claims 1 or 2 wherein said spacing means comprises an elongated member located at least under substantially the central portion of said platform member and additionally supporting said platform member.

19. The pet sanitary facility of claim 18 further comprising support means under said stack of interleaved layers over at least a portion of the periphery of said stack to raise peripheral portions of said stack.

20. The pet sanitary facility of either of claims 1 or 2 wherein said spacing means comprises a plurality of spacing members located at least under substantially the central portion of said platform member and additionally supporting said platform member.

21. The pet sanitary facility of claim 20 further comprising support means under said stack of interleaved layers over at least a portion of the periphery of said stack to raise peripheral portions of said stack.

* * * * *